(12) United States Patent
Schoppel

(10) Patent No.: US 11,821,654 B1
(45) Date of Patent: Nov. 21, 2023

(54) ATTIC HOT AIR RECIRCULATION SYSTEM

(71) Applicant: Chad Schoppel, Huntsville (CA)

(72) Inventor: Chad Schoppel, Huntsville (CA)

( * ) Notice: Subject to any disclaimer, the term of this patent is extended or adjusted under 35 U.S.C. 154(b) by 133 days.

(21) Appl. No.: 17/510,498

(22) Filed: Oct. 26, 2021

(51) Int. Cl.
| | |
|---|---|
| *F24F 5/00* | (2006.01) |
| *F24S 20/67* | (2018.01) |
| *F24F 7/02* | (2006.01) |
| *F24F 11/76* | (2018.01) |
| *F24F 11/00* | (2018.01) |
| *F24F 110/10* | (2018.01) |

(52) U.S. Cl.
CPC ............ *F24F 5/0046* (2013.01); *F24F 7/025* (2013.01); *F24F 11/0001* (2013.01); *F24F 11/76* (2018.01); *F24S 20/67* (2018.05); *F24F 2005/0064* (2013.01); *F24F 2110/10* (2018.01)

(58) Field of Classification Search
CPC ...... F24F 5/0046; F24F 7/025; F24F 11/0001; F24F 11/76; F24F 2005/0064; F24F 2110/10; F24S 20/67; F24D 5/005
See application file for complete search history.

(56) References Cited

U.S. PATENT DOCUMENTS

| | | | | |
|---|---|---|---|---|
| 4,103,825 A | 8/1978 | Zornig | | |
| 4,182,401 A | 1/1980 | Pinnell | | |
| 4,254,822 A | 3/1981 | Geier | | |
| 4,272,268 A | * | 6/1981 | Greiner | ................... F25B 17/08 |
| | | | | 62/480 |
| 4,308,858 A | * | 1/1982 | Skillman | ............... F24S 80/525 |
| | | | | 126/623 |
| 4,437,511 A | | 3/1984 | Sheridan | |
| 4,478,210 A | * | 10/1984 | Sieradski | ................ F24S 10/80 |
| | | | | 126/714 |
| 4,502,467 A | | 3/1985 | Smith | |
| 5,452,710 A | | 9/1995 | Palmer | |
| D397,202 S | | 8/1998 | Saar | |
| 2007/0277811 A1 | * | 12/2007 | Hollick | ................. F24F 5/0075 |
| | | | | 126/621 |
| 2008/0236058 A1 | * | 10/2008 | Antonie | .................. E04D 13/17 |
| | | | | 52/302.1 |
| 2014/0242898 A1 | * | 8/2014 | Richards | ................... F24F 7/04 |
| | | | | 454/237 |

(Continued)

FOREIGN PATENT DOCUMENTS

| | | | |
|---|---|---|---|
| JP | 59071947 A | * | 4/1984 |
| JP | 60011057 A | * | 1/1985 |

(Continued)

*Primary Examiner* — Nelson J Nieves

(57) ABSTRACT

The attic hot air recirculation system is mechanical system. The attic hot air recirculation system is configured for use with an HVAC system of a building. The attic hot air recirculation system is energy saving technology. The attic hot air recirculation system captures solar energy from the roof of the building. The attic hot air recirculation system monitors the temperature of the captured solar energy and the temperature of a chamber in the building. The attic hot air recirculation system uses the heat generated from the captured solar energy to heat a chamber in the room. When the temperature difference between the temperature of the captured solar energy and the temperature of a chamber in the building makes it thermodynamically favorable to do so, the attic hot air recirculation system transfers heat from the roof into the chamber.

14 Claims, 5 Drawing Sheets

(56) References Cited

U.S. PATENT DOCUMENTS

| | | | |
|---|---|---|---|
| 2015/0247652 A1* | 9/2015 | Coulter | F24S 10/30 |
| | | | 126/632 |
| 2016/0065125 A1* | 3/2016 | Kondo | G02B 5/22 |
| | | | 126/652 |
| 2017/0237390 A1* | 8/2017 | Hudson | E04D 3/361 |
| | | | 136/251 |
| 2018/0306466 A1* | 10/2018 | Coulter | F28D 20/02 |
| 2021/0265938 A1* | 8/2021 | Van Giesen | H02S 30/10 |
| 2021/0376787 A1* | 12/2021 | Ryan | H02S 30/20 |

FOREIGN PATENT DOCUMENTS

| | | | | | |
|---|---|---|---|---|---|
| JP | 60073217 | A | * | 4/1985 | |
| JP | 10140686 | A | * | 5/1998 | F24J 2/045 |
| JP | 2015137782 | A | * | 7/2015 | |
| WO | 2008025849 | | | 3/2008 | |

* cited by examiner

ATTIC HOT AIR RECIRCULATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of the use of solar or other natural energy sources combined with household units, more specifically, an HVAC system. (F24F5/0046)

SUMMARY OF INVENTION

The attic hot air recirculation system is a mechanical system. The attic hot air recirculation system is configured for use with an HVAC system of a building. The attic hot air recirculation system is energy saving technology. The attic hot air recirculation system captures solar energy from the roof of the building. The attic hot air recirculation system monitors the temperature of the captured solar energy and the temperature of a chamber in the building. The attic hot air recirculation system uses the heat generated from the captured solar energy to heat a chamber in the room. When the temperature difference between the temperature of the captured solar energy and the temperature of a chamber in the building makes it thermodynamically favorable to do so, the attic hot air recirculation system transfers heat from the roof into the chamber. The attic hot air recirculation system comprises a heat capture structure, a discharge duct, an intake duct, a control circuit, the roof, and the chamber. The heat capture structure mounts in the roof. The discharge duct forms a fluidic connection between the chamber and the heat capture structure. The intake duct forms a fluidic connection between the chamber and the heat capture structure. The control circuit controls the flow of air between the heat capture structure and the chamber.

These together with additional objects, features and advantages of the attic hot air recirculation system will be readily apparent to those of ordinary skill in the art upon reading the following detailed description of the presently preferred, but nonetheless illustrative, embodiments when taken in conjunction with the accompanying drawings.

In this respect, before explaining the current embodiments of the attic hot air recirculation system in detail, it is to be understood that the attic hot air recirculation system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the attic hot air recirculation system.

It is therefore important that the claims be regarded as including such equivalent construction insofar as they do not depart from the spirit and scope of the attic hot air recirculation system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
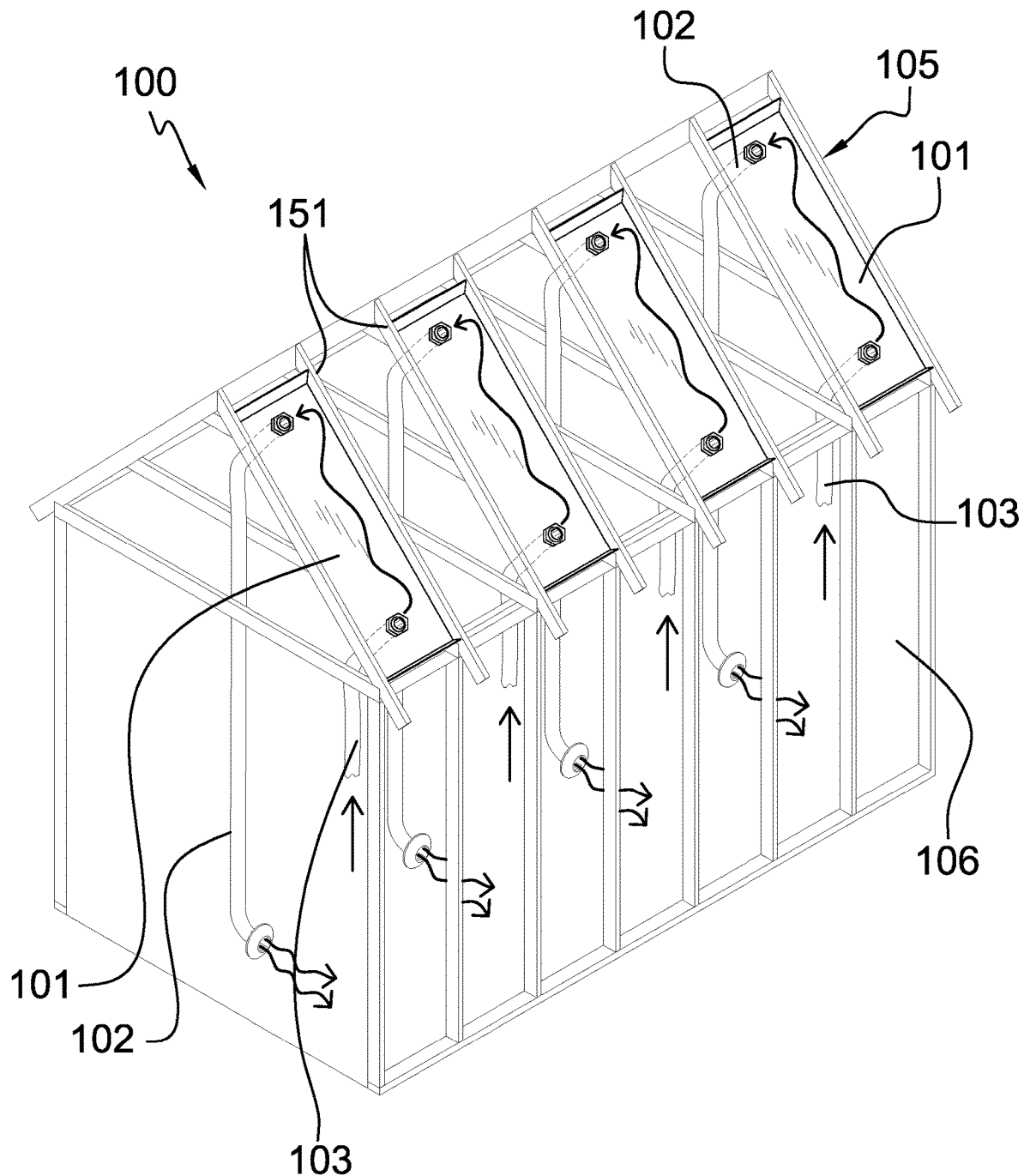
FIG. 1 is a perspective view of an embodiment of the disclosure.
Figure 2:
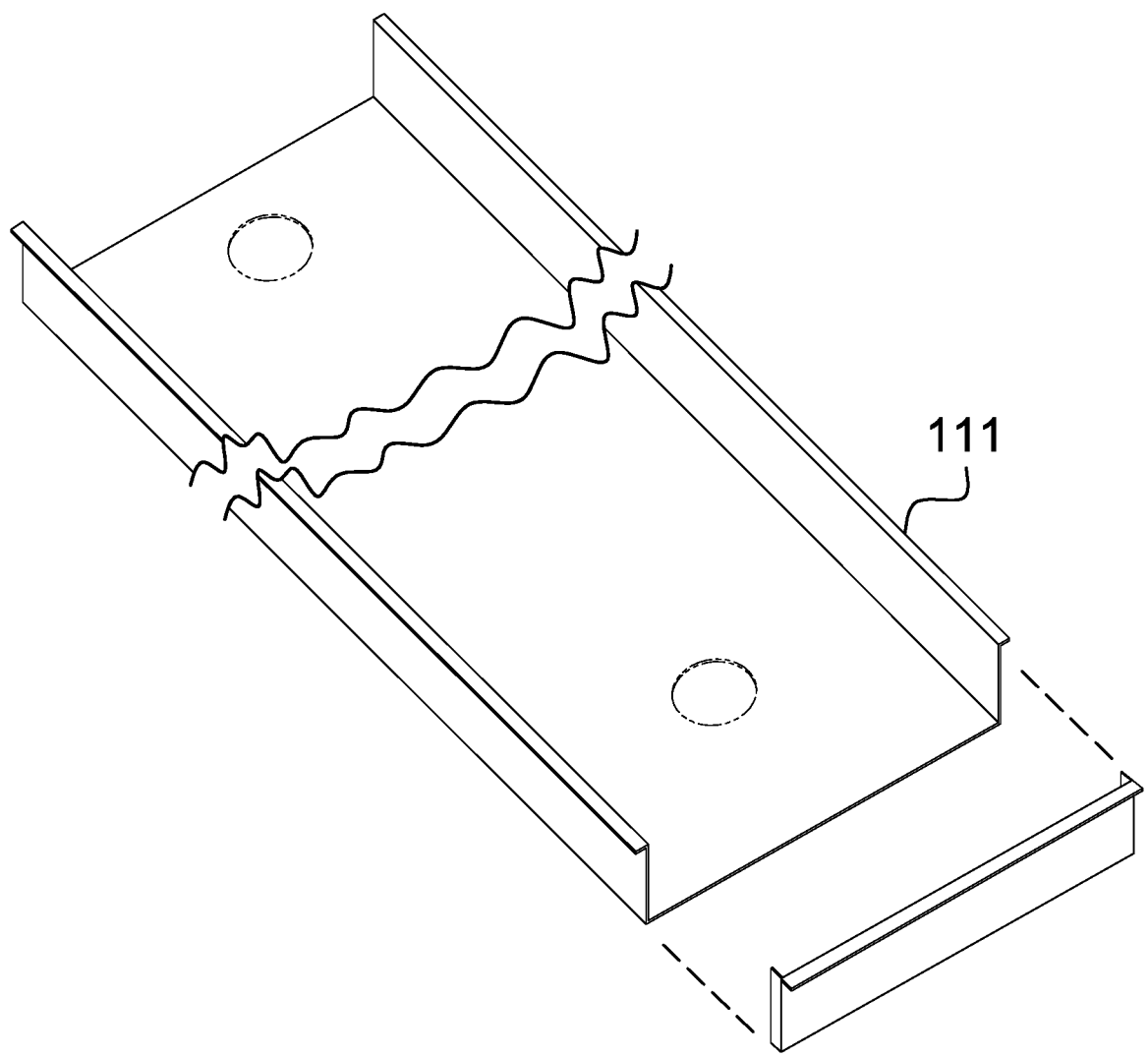
FIG. 2 is a detail view of an embodiment of the disclosure.
Figure 3:
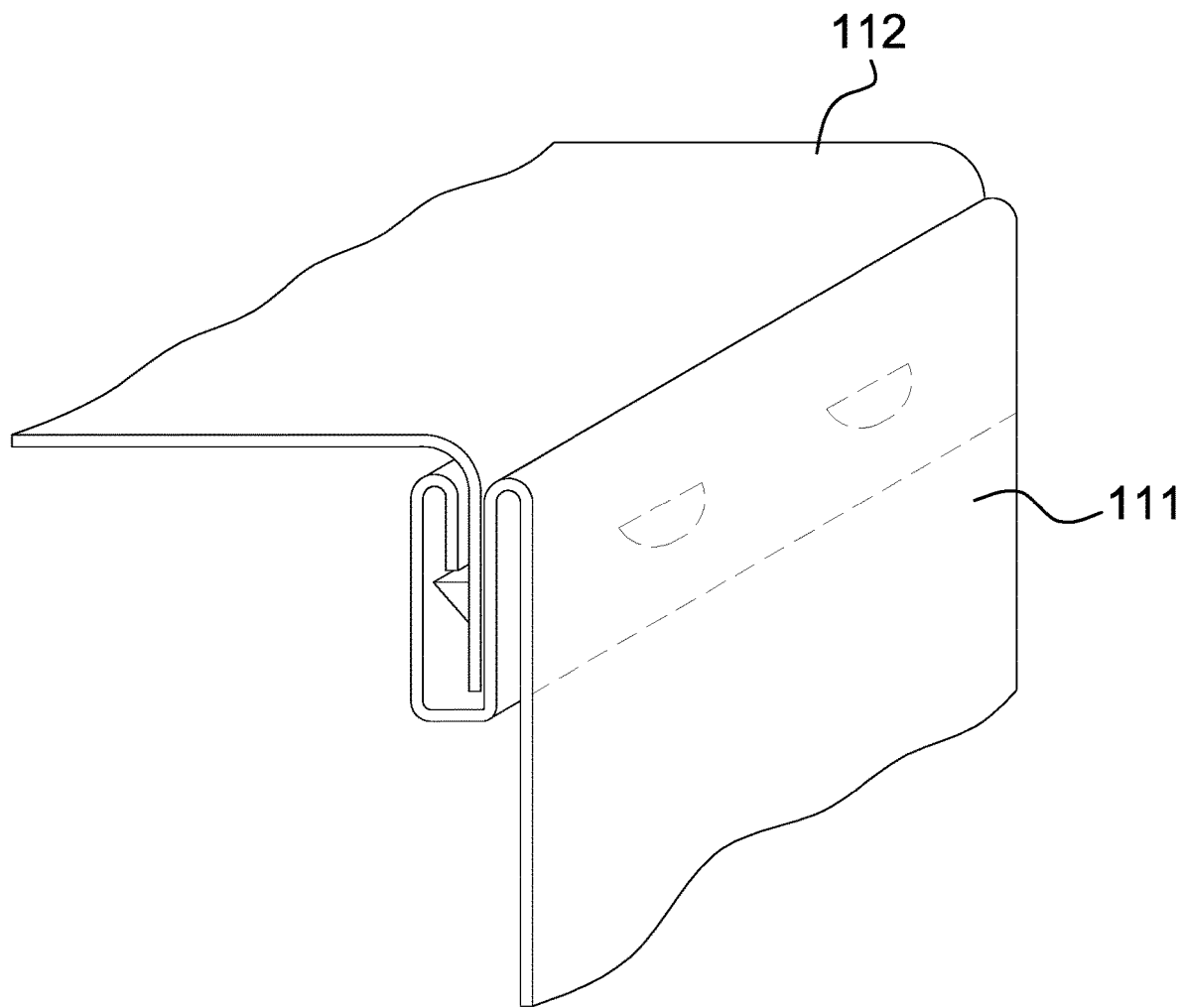
FIG. 3 is a detail view of an embodiment of the disclosure.
Figure 4:
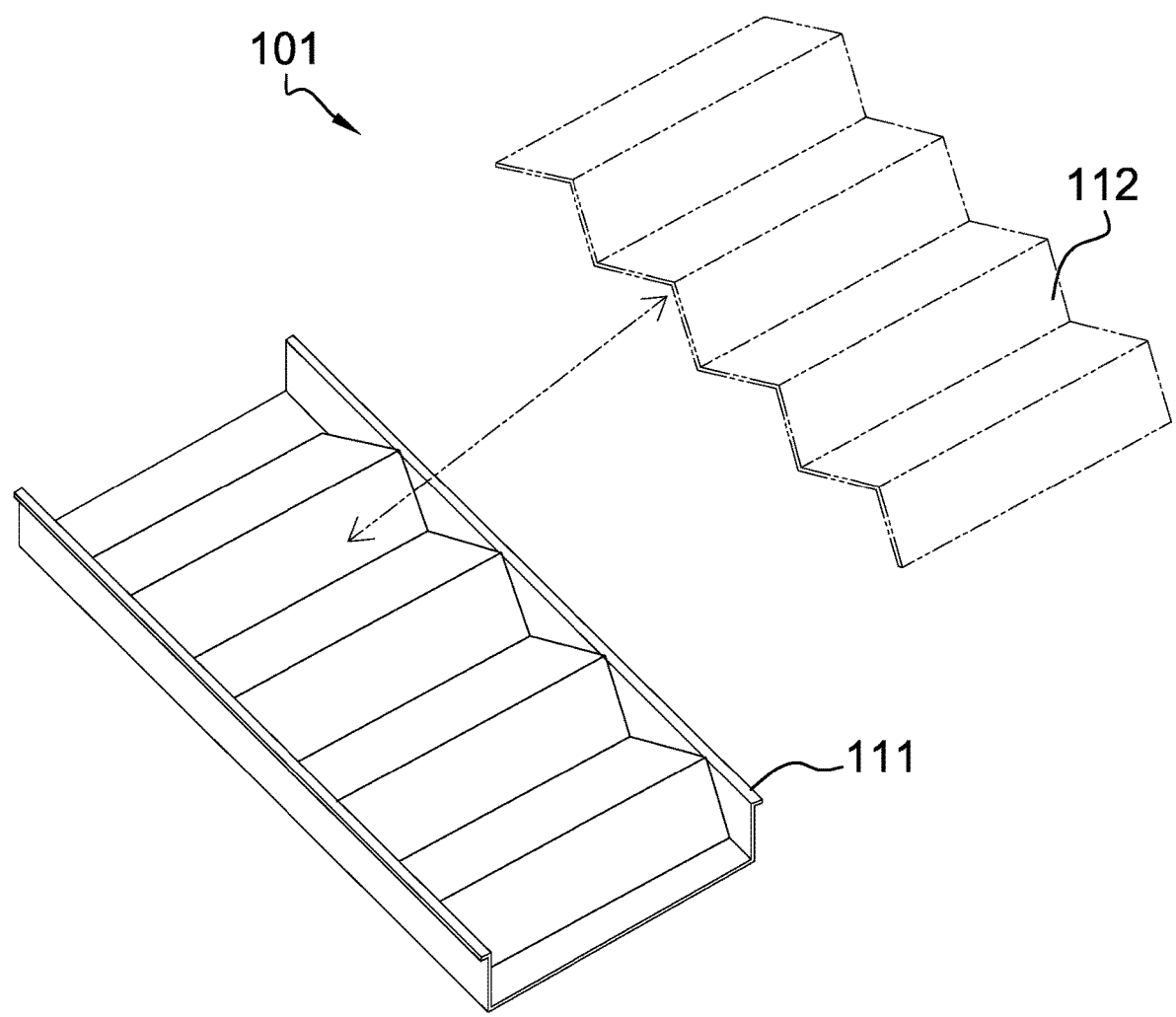
FIG. 4 is a detail view of an embodiment of the disclosure.
Figure 5:
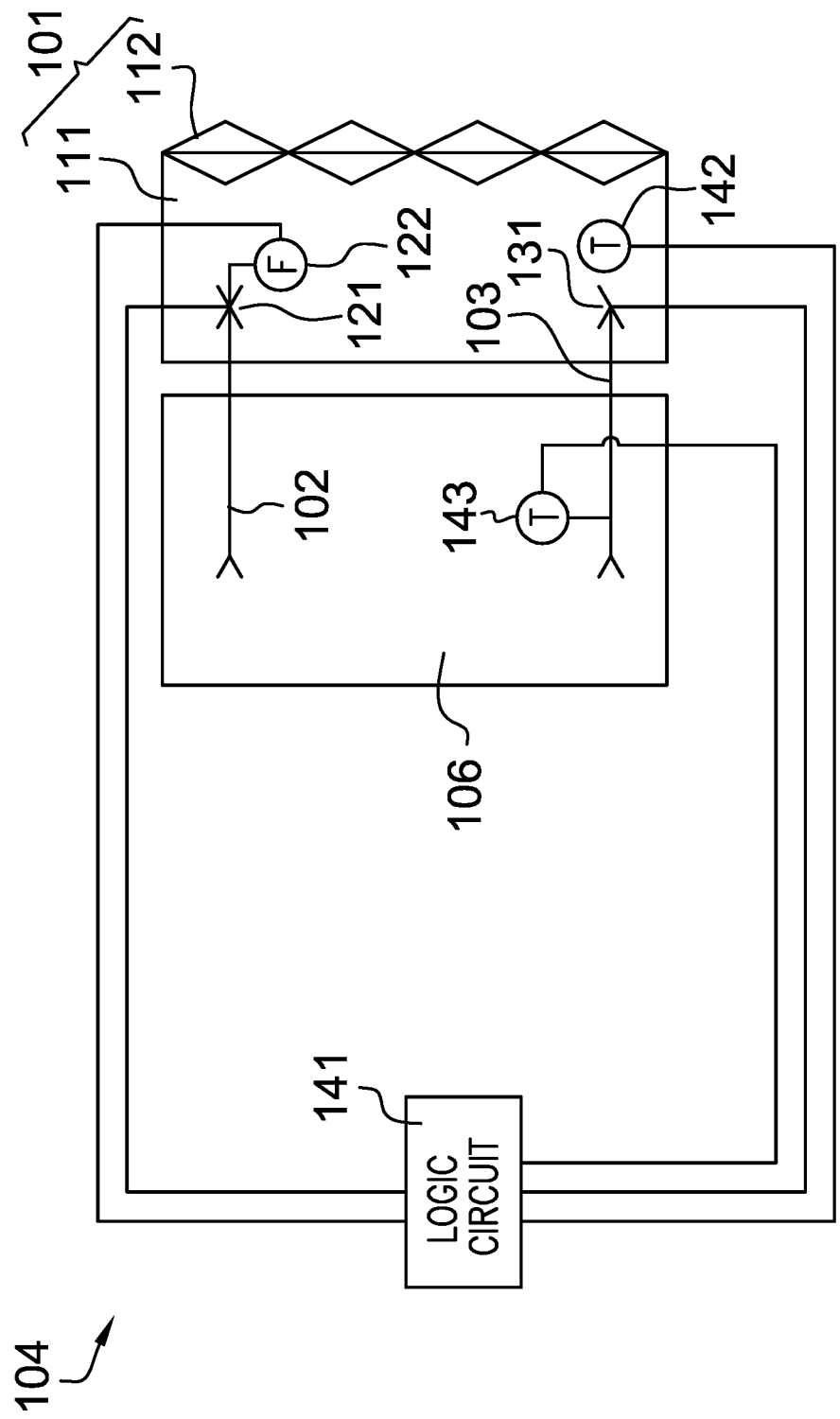
FIG. 5 is a schematic view of an embodiment of the disclosure.

Detailed reference will now be made to one or more potential embodiments of the disclosure, which are illustrated in FIGS. 1 through 5.

The attic hot air recirculation system 100 (hereinafter invention) is mechanical system. The invention 100 is configured for use with an HVAC system of a building. The invention 100 is energy saving technology. The invention 100 captures solar energy from the roof 105 of the building. The invention 100 monitors the temperature of the captured solar energy and the temperature of a chamber 106 in the building. The invention 100 uses the heat generated from the captured solar energy to heat a chamber 106 in the room. When the temperature difference between the temperature of the captured solar energy and the temperature of a chamber 106 in the building makes it thermodynamically favorable to do so, the invention 100 transfers heat from the roof 105 into the chamber 106.

The invention 100 comprises a heat capture structure 101, a discharge duct 102, an intake duct 103, a control circuit 104, the roof 105, and the chamber 106. The heat capture structure 101 mounts in the roof 105. The discharge duct 102 forms a fluidic connection between the chamber 106 and the heat capture structure 101. The intake duct 103 forms a fluidic connection between the chamber 106 and the heat capture structure 101. The control circuit 104 controls the flow of air between the heat capture structure 101 and the chamber 106.

The roof 105 forms the superior structure of a building that encloses the protected spaces formed within the building. The roof 105 is defined elsewhere in this disclosure. The chamber 106 is a protected space formed in the building. The chamber 106 is defined elsewhere in this disclosure. The roof 105 further comprises a plurality of rafters 151. The rafter 151 is defined elsewhere in this disclosure.

The heat capture structure 101 is a mechanical structure. The heat capture structure 101 is a roughly prism shaped structure. The heat capture structure 101 is a hollow structure. The heat capture structure 101 forms a fluidic connection with the chamber 106. The heat capture structure 101 mounts between two adjacent rafters 151 selected from the supporting structure of the roof 105. The heat capture structure 101 is structured such that the heat capture structure 101 only exchanges air with the chamber 106. The control circuit 104 controls the flow of air between the chamber 106 and the heat capture structure 101.

The air contained in the heat capture structure 101 is isolated from the air in the chamber 106. When the control circuit 104 determines that a thermodynamically favorable temperature differential between the hollow interior of the heat capture structure 101 and the chamber 106 exists, the control circuit 104 enables the fluidic connections between the heat capture structure 101 and the chamber 106. The chamber 106 then provides the motive forces required to generate an air flow between the heat capture structure 101 and the chamber 106 to change the temperature of the air in the chamber 106 in a desirable direction.

The heat capture structure 101 comprises a containment pan 111 and a transfer baffle 112.

The containment pan 111 is a prism shaped structure. The containment pan 111 is formed as a pan. The containment pan 111 forms the containment space of the hollow interior of the heat capture structure 101.

The transfer baffle 112 is a non-Euclidean disk structure. The transfer baffle 112 attaches to the containment pan 111. The transfer baffle 112 encloses the open face of the pan structure of the containment pan 111 to form a fluid impermeable structure. The transfer baffle 112 forms a corrugated structure. The transfer baffle 112 has the appearance of an accordion fold. The transfer baffle 112 forms the surface of the heat capture structure 101 that is proximal to the exterior surface of the roof 105. The transfer baffle 112 forms a heat exchange structure that transfers heat from between the hollow interior of the heat capture structure 101 and the exterior surface of the roof 105. The corrugated structure of the transfer baffle 112 increases the surface area available for the transfer of heat between the heat capture structure 101 and the exterior surface of the roof 105.

The discharge duct 102 is a pipe. The control circuit 104 controls the flow of air through the discharge duct 102. The discharge duct 102 forms a fluidic connection between the hollow interior of the heat capture structure 101 and the chamber 106. The discharge duct 102 transports air from the hollow interior of the heat capture structure 101 to the chamber 106. The discharge duct 102 comprises a discharge damper 121 and a discharge fan 122.

The discharge damper 121 is an electrically controlled valve. The discharge damper 121 electrically connects to the control circuit 104. The control circuit 104 controls the operation of the discharge damper 121. The control circuit 104 actuates the discharge damper 121 to a closed position when the control circuit 104 determines that a thermodynamically unfavorable temperature differential between the hollow interior of the heat capture structure 101 and the chamber 106 exists. The control circuit 104 actuates the discharge damper 121 to an open position when the control circuit 104 determines that a thermodynamically favorable temperature differential between the hollow interior of the heat capture structure 101 and the chamber 106 exists.

The discharge fan 122 is a pump. The discharge fan 122 generates the motive forces that exchanges the air contained within the hollow interior of the heat capture structure 101 into the chamber 106. The discharge fan 122 creates a pressure differential that transports the air contained in the hollow interior of the heat capture structure 101 into the discharge damper 121 with enough pressure transport the air into the chamber 106. The movement of air into the discharge damper 121 by the discharge fan 122 creates a partial vacuum that make-up air draws air from the chamber 106 and through the intake duct 103 into the heat capture structure 101.

The intake duct 103 is a pipe. The control circuit 104 controls the flow of air through the intake duct 103. The intake duct 103 forms a fluidic connection between the hollow interior of the heat capture structure 101 and the chamber 106. The intake duct 103 transports air from the chamber 106 to the hollow interior of the chamber 106. The intake duct 103 comprises an intake damper 131.

The intake damper 131 is an electrically controlled valve. The intake damper 131 electrically connects to the control circuit 104. The control circuit 104 controls the operation of the intake damper 131. The control circuit 104 actuates the intake damper 131 to a closed position when the control circuit 104 determines that a thermodynamically unfavorable temperature differential between the hollow interior of the heat capture structure 101 and the chamber 106 exists. The control circuit 104 actuates the intake damper 131 to an open position when the control circuit 104 determines that a thermodynamically favorable temperature differential between the hollow interior of the heat capture structure 101 and the chamber 106 exists.

The control circuit 104 is an electric circuit. The control circuit 104 controls the flow of air between the hollow interior of the heat capture structure 101 and the chamber 106. The control circuit 104 measures the temperature of the air contained in the heat capture structure 101. The control circuit 104 measures the temperature of the air in the chamber 106.

The control circuit 104 isolates the heat capture structure 101 from the chamber 106 when the control circuit 104 determines that a thermodynamically unfavorable temperature differential between the hollow interior of the heat capture structure 101 and the chamber 106 exists. The control circuit 104 enables the fluidic connections between the heat capture structure 101 and the chamber 106 when the control circuit 104 determines that a thermodynamically favorable temperature differential between the hollow interior of the heat capture structure 101 and the chamber 106 exists. The control circuit 104 generates the motive forces that exchanges the air contained within the hollow interior of the heat capture structure 101.

The control circuit 104 comprises a logic circuit 141, a containment space temperature sensor 142, and a chamber 106 temperature sensor 143.

The logic circuit 141 is an electric circuit. The logic circuit 141 electrically connects to the containment space temperature sensor 142. The logic circuit 141 determines the temperature of the air in the heat capture structure 101 using the containment space temperature sensor 142. The logic circuit 141 electrically connects to the chamber 106 temperature sensor 143. The logic circuit 141 determines the temperature of the air in the chamber 106 using the chamber 106 temperature sensor 143. The logic circuit 141 calculates the difference between the measured temperature of the air in the heat capture structure 101 and the measured temperature of the air in the chamber 106.

The logic circuit 141 electrically connects to the discharge damper 121. The logic circuit 141 actuates the discharge damper 121 to a closed position when the logic circuit 141 determines that a thermodynamically unfavorable temperature differential between the hollow interior of the heat capture structure 101 and the chamber 106 exists. The logic circuit 141 actuates the discharge damper 121 to an open position when the logic circuit 141 determines that a thermodynamically favorable temperature differential between the hollow interior of the heat capture structure 101 and the chamber 106 exists.

The logic circuit 141 electrically connects to the intake damper 131. The logic circuit 141 actuates the intake damper 131 to a closed position when the logic circuit 141 determines that a thermodynamically unfavorable temperature differential between the hollow interior of the heat capture structure 101 and the chamber 106 exists. The logic circuit 141 actuates the intake damper 131 to an open position when the logic circuit 141 determines that a thermodynamically favorable temperature differential between the hollow interior of the heat capture structure 101 and the chamber 106 exists.

The logic circuit 141 electrically connects to the discharge fan 122. The logic circuit 141 discontinues the operation of the discharge fan 122 when the logic circuit 141 determines that a thermodynamically unfavorable temperature differential between the hollow interior of the heat capture structure 101 and the chamber 106 exists. The logic circuit 141 initiates the operation of the discharge fan 122 when the logic circuit 141 determines that a thermodynamically favorable temperature differential between the hollow interior of the heat capture structure 101 and the chamber 106 exists.

The containment space temperature sensor 142 is a temperature senor. The containment space temperature sensor 142 mounts in the heat capture structure 101 such that the containment space temperature sensor 142 measures the temperature of the air in the hollow interior of the heat capture structure 101. The containment space temperature sensor 142 transmits an electric signal to the logic circuit 141 that indicates the temperature that is measured by the containment space temperature sensor 142.

The chamber 106 temperature sensor 143 is a temperature senor. The chamber 106 temperature sensor 143 mounts in the heat capture structure 101 such that the chamber 106 temperature sensor 143 measures the temperature of the air in the hollow interior of the heat capture structure 101. The chamber 106 temperature sensor 143 transmits an electric signal to the logic circuit 141 that indicates the temperature that is measured by the chamber 106 temperature sensor 143.

The following definitions were used in this disclosure:

Accordion Fold: As used in this disclosure, an accordion fold is a corrugated structure that resembles the bellows of an accordion.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Baffle: As used in this disclosure, a baffle is a structure that is used to inhibit or divert a gas or fluid flow.

Barrier: As used in this disclosure, a barrier is a physical obstacle that forms a boundary between a first space and a second space. The barrier prevents the passage of an object between the first space and the second space.

Beam: As used in this disclosure, a beam is a horizontally oriented load bearing structure that is commonly used to support a floor or a roof of a building.

Building: As used in this disclosure, a building is a structure located a fixed position that forms one or more enclosable spaces. The building forms a space selected from the group consisting of a protected space or a protection space. A building is often referred to as a structure. Use barrier, chamber, protected space and protection space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable space within a building.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Corrugated: As used in this disclosure, the term corrugated describes a structure or a surface that is formed from a first set of parallel disks or surfaces and a second set of parallel disks or surfaces. The corrugated surface is formed by interlacing the first set of parallel disks or surfaces and the second set of parallel disks or surfaces to form a non-Euclidean structure. Non-Euclidean structure and interlace.

Damper: As used in this disclosure, a damper is a device that: a) controls the volume of air flows into or through a structure; or, b) controls the routing and direction of the air that flows through a structure.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Duct: As used in this disclosure, a duct is a tube, pipe, canal or channel through which air is conducted or conveyed.

Electrically Operated Valve: As used in this disclosure, an electrically operated valve is a valve that: a) uses electrical energy to power the actuation of the electrically operated valve; or b) uses electrically generated signals to control the actuation of the electrically operated valve. A solenoid valve is a type of electrically operated valve.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fan: As used in this disclosure, a fan is a pump that moves a gas. The first potential embodiment of this disclosure assumes that the fan is a mechanical device with rotating blades that is used to create a flow or current of a gas.

Fascia: As used in this disclosure, a fascia is a structural element (such as a wooden board) positioned between the top of a wall and the projecting eaves of a roof such that the horizontal element covers the rafters. The visible surface of the vertical element runs parallel to the direction of gravity.

Flashing: As used within this disclosure, a flashing is a sheeting that forms a water barrier between a roof and a second structure.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

HVAC: As used in this disclosure, HVAC is an acronym for Heating Ventilation and Air Conditioning and is a general term that refers to the air handling technology used within buildings.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interlace: As used in this disclosure, to interlace means to align a series of linear objects selected in an alternating manner. The linear objects are selected from two or more groups of linear objects. The alternating manner is a function of the group the linear object is identified with.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Make-Up Air: As used in this disclosure, make-up air is air that permitted to enter a enclose space for the purpose of replacing air that has been evacuated in some manner, for example by a fan, from the enclosed space.

Manifold: As used in this disclosure, a manifold is a pipe or chamber having several ports through which one or more fluids are gathered or distributed.

Negative Space: As used in this disclosure, negative space is a method of defining an object through the use of open or empty space as the definition of the object itself, or, through the use of open or empty space to describe the boundaries of an object.

Network: As used in this disclosure, a network refers to a transport structure that: a) receives a fluid into the network; b) transports the fluid through a series of pipes, valves, and manifold; and, c) discharges the fluid from the network.

Non-Euclidean Disk: As used in this disclosure, a non-Euclidean structure is a disk-shaped structure wherein the congruent end (faces) of the disk structure lies on a non-Euclidean plane.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Pitched Roof: As used in this disclosure; a pitched roof refers to a roof wherein the surface of the roof forms a cant that is not perpendicular to the force of gravity.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Protection Space: As used in this disclosure, a protection space is a space formed by a boundary structure. The boundary structure forms a protective barrier that protects objects outside the protection space from potential dangers from the operation of a device or process contained within the protection space.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Rafter: As used in this disclosure, a rafter is a sloping structure or beam that is used to support a pitched roof.

Roof: As used in this disclosure, a roof is the exterior surface of a structure that is distal from the surface upon which the structure is placed. As used in this disclosure, the exterior surface is assumed to include the supporting structures associated with the exterior surface including, but not limited to, rafters, decking, soffits and fascia. A pitched roof is a roof wherein the surface of the roof has a cant that is not perpendicular to the direction of gravity.

Roughly: As used in this disclosure, roughly refers to a comparison between two objects. Roughly means that the difference between one or more parameters of the two compared objects are not significantly different.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Soffit: As used in this disclosure, a soffit is a foundation upon which a structure is built. In a roof, the soffit is the base upon which the rafters are erected.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Temperature Sensor: As used in this disclosure, a temperature sensor is a device that is used to measure the temperature of an object or a space.

Valve: As used in this disclosure, a valve is a device that is used to control the flow of a fluid (gas or liquid) through a pipe, tube, or hose.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall Plate: As used in this disclosure, the wall plate refers to the superior surface of an exterior wall of a building that is underneath a roof. The wall plate is often fitted with a mechanical structure intended to attach the roof to the building.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An attic recirculation system comprising
wherein the attic recirculation system comprises a heat capture structure, a discharge duct, an intake duct, a control circuit, a roof, and a chamber;
wherein the heat capture structure mounts in the roof;
wherein the discharge duct forms a fluidic connection between the chamber and the heat capture structure;
wherein the intake duct forms a fluidic connection between the chamber and the heat capture structure;
wherein the control circuit controls the flow of air between the heat capture structure and the chamber;
wherein the roof forms a superior structure of a building that encloses a protected spaces formed within the building;
wherein the heat capture structure comprises a containment pan and a transfer baffle;
wherein the containment pan is formed as a pan;
wherein the transfer baffle attaches to the containment pan;
wherein the containment pan forms a containment space of the hollow interior of the heat capture structure;
wherein the transfer baffle is a non-Euclidean disk structure;
wherein the transfer baffle encloses an open face of a pan structure of the containment pan to form a fluid impermeable structure;
wherein the transfer baffle forms a corrugated structure;
wherein the transfer baffle has an accordion fold;
wherein the transfer baffle forms a surface of the heat capture structure that is adjacent to an exterior surface of the roof; and
wherein the transfer baffle forms a heat exchange structure.

2. The attic recirculation system according to claim 1
wherein the attic recirculation system is configured for use with an HVAC system of a building;
wherein a chamber is the protected space formed in the building;
wherein the roof further comprises a plurality of rafters;
wherein the attic recirculation system captures solar energy from the roof of the building;
wherein the attic recirculation system monitors a temperature of the captured solar energy and changes temperature of the chamber in the building;

wherein the attic recirculation system uses the heat generated from the captured solar energy to heat the chamber in the room; and
wherein the attic recirculation system transfers heat from the roof into the chamber.

3. The attic recirculation system according to claim 2
wherein the heat capture structure is a mechanical structure;
wherein the heat capture structure is a hollow structure;
wherein the heat capture structure forms a fluidic connection with the chamber; and
wherein the heat capture structure mounts between two adjacent rafters selected from a supporting structure of the roof.

4. The attic recirculation system according to claim 3
wherein the heat capture structure is structured such that the heat capture structure only exchanges air with the chamber;
wherein the air contained in the heat capture structure is isolated from the air in the chamber;
wherein when the control circuit determines that a temperature differential between the hollow interior of the heat capture structure and the chamber exists, the control circuit enables the fluidic connections between the heat capture structure and the chamber; and
wherein the chamber then provides the motive forces required to generate an air flow between the heat capture structure and the chamber to change the temperature of the air in the chamber in a desirable direction.

5. The attic recirculation system according to claim 4
wherein the discharge duct is a pipe;
wherein the control circuit controls the flow of air through the discharge duct;
wherein the discharge duct forms a fluidic connection between the hollow interior of the heat capture structure and the chamber; and
wherein the discharge duct transports air from the hollow interior of the heat capture structure to the chamber.

6. The attic recirculation system according to claim 5
wherein the intake duct is a pipe;
wherein the control circuit controls the flow of air through the intake duct;
wherein the intake duct forms a fluidic connection between the hollow interior of the heat capture structure and the chamber; and
wherein the intake duct transports air from the chamber to the hollow interior of the chamber.

7. The attic recirculation system according to claim 6
wherein the control circuit is an electric circuit;
wherein the control circuit controls the flow of air between the hollow interior of the heat capture structure and the chamber;
wherein the control circuit measures the temperature of the air contained in the heat capture structure;
wherein the control circuit measures the temperature of the air in the chamber;
wherein the control circuit isolates the heat capture structure from the chamber when the control circuit determines that a thermodynamically unfavorable temperature differential between the hollow interior of the heat capture structure and the chamber exists;
wherein the control circuit enables the fluidic connections between the heat capture structure and the chamber when the control circuit determines that a thermodynamically favorable temperature differential between the hollow interior of the heat capture structure and the chamber exists; and
wherein the control circuit generates the motive forces that exchanges the air contained within the hollow interior of the heat capture structure.

8. The attic recirculation system according to claim 7
wherein the discharge duct comprises a discharge damper and a discharge fan;
wherein the discharge damper is an electrically controlled valve; and
wherein the discharge fan generates the motive forces that exchanges the air contained within the hollow interior of the heat capture structure into the chamber.

9. The attic recirculation system according to claim 8
wherein the intake duct comprises an intake damper; and
wherein the intake damper is an electrically controlled valve.

10. The attic recirculation system according to claim 9
wherein the control circuit comprises a logic circuit, a containment space temperature sensor, and a chamber temperature sensor;
wherein the logic circuit is an electric circuit;
wherein the logic circuit electrically connects to the containment space temperature sensor; and
wherein the logic circuit electrically connects to the chamber temperature sensor.

11. The attic recirculation system according to claim 10
wherein the discharge damper electrically connects to the control circuit;
wherein the control circuit controls an operation of the discharge damper;
wherein the control circuit actuates the discharge damper to a closed position when the control circuit determines that a temperature differential between the hollow interior of the heat capture structure and the chamber exists;
wherein the control circuit actuates the discharge damper to an open position when the control circuit determines that a temperature differential between the hollow interior of the heat capture structure and the chamber exists;
wherein the discharge fan is a pump;
wherein the discharge fan creates a pressure differential that transports the air contained in the hollow interior of the heat capture structure into the discharge damper with enough pressure transport the air into the chamber; and
wherein a movement of air into the discharge damper by the discharge fan creates a partial vacuum that make-up air draws air from the chamber and through the intake duct into the heat capture structure.

12. The attic recirculation system according to claim 11
wherein the intake damper electrically connects to the control circuit;
wherein the control circuit controls an operation of the intake damper;
wherein the control circuit actuates the intake damper to a closed position when the control circuit determines that a temperature differential between the hollow interior of the heat capture structure and the chamber exists; and
wherein the control circuit actuates the intake damper to an open position when the control circuit determines that a temperature differential between the hollow interior of the heat capture structure and the chamber exists.

13. The attic recirculation system according to claim 12
wherein the logic circuit determines the temperature of the air in the heat capture structure using the containment space temperature sensor;
wherein the logic circuit determines the temperature of the air in the chamber using the chamber temperature sensor;
wherein the logic circuit calculates the difference between the measured temperature of the air in the heat capture structure and the measured temperature of the air in the chamber;
wherein the logic circuit electrically connects to the discharge damper;
wherein the logic circuit actuates the discharge damper to a closed position when the logic circuit determines that a temperature differential between the hollow interior of the heat capture structure and the chamber exists;
wherein the logic circuit actuates the discharge damper to an open position when the logic circuit determines that a temperature differential between the hollow interior of the heat capture structure and the chamber exists;
wherein the logic circuit electrically connects to the intake damper;
wherein the logic circuit actuates the intake damper to a closed position when the logic circuit determines that a temperature differential between the hollow interior of the heat capture structure and the chamber exists;
wherein the logic circuit actuates the intake damper to an open position when the logic circuit determines that a temperature differential between the hollow interior of the heat capture structure and the chamber exists;
wherein the logic circuit electrically connects to the discharge fan;
wherein the logic circuit discontinues the operation of the discharge fan when the logic circuit determines that a temperature differential between the hollow interior of the heat capture structure and the chamber exists; and
wherein the logic circuit initiates the operation of the discharge fan when the logic circuit determines that a temperature differential between the hollow interior of the heat capture structure and the chamber exists.

14. The attic recirculation system according to claim 13 wherein the containment space temperature sensor is a temperature senor;
wherein the containment space temperature sensor mounts in the heat capture structure such that the containment space temperature sensor measures the temperature of the air in the hollow interior of the heat capture structure;
wherein the containment space temperature sensor transmits an electric signal to the logic circuit that indicates the temperature that is measured by the containment space temperature sensor;
wherein the chamber temperature sensor mounts in the heat capture structure such that the chamber temperature sensor measures the temperature of the air in the hollow interior of the heat capture structure; and
wherein the chamber temperature sensor transmits an electric signal to the logic circuit that indicates the temperature that is measured by the chamber temperature sensor.

* * * * *